March 21, 1967 — I. CHICHESTER-MILES — 3,310,260
VSTOL AIRCRAFT
Filed Feb. 1, 1965 — 4 Sheets-Sheet 1

Inventor
Ian Chichester-Miles
By Dowell M Dowell
Attorneys

March 21, 1967 I. CHICHESTER-MILES 3,310,260
VSTOL AIRCRAFT

Filed Feb. 1, 1965 4 Sheets-Sheet 3

Ian Chichester-Miles Inventor
By Dowell H Dowell
Attorneys

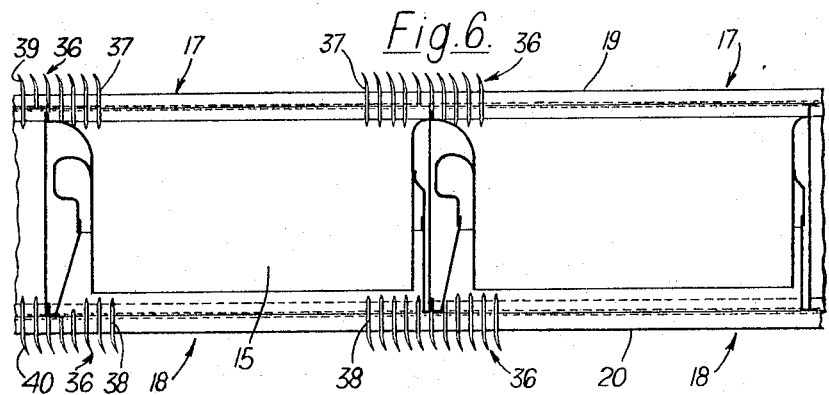
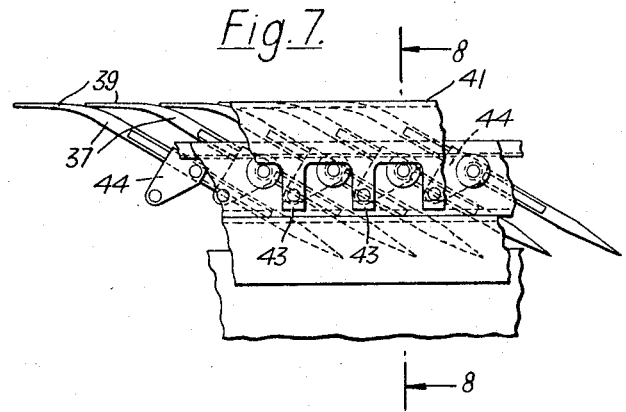
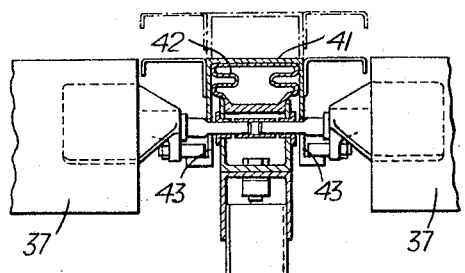

United States Patent Office 3,310,260
Patented Mar. 21, 1967

3,310,260
VSTOL AIRCRAFT
Ian Chichester-Miles, Harpenden, England, assignor to Hawker Siddeley Aviation Limited, London, England
Filed Feb. 1, 1965, Ser. No. 429,252
Claims priority, application Great Britain, Jan. 31, 1964, 4,346/64
14 Claims. (Cl. 244—12)

This invention relates to vertical and short take-off aircraft, that is to say, aircraft which have means for providing vertical lift other than that given by forward flight.

An obvious potential advantage of civil VTOL aircraft is the ability to operate from comparatively small landing areas within cities. However, to make such operation practicable it is necessary to provide an aircraft that is particularly safe in the VTOL mode and to overcome the problem of noise. The present invention affords a new approach to both these problems.

According to the invention, a vertical or short take-off aircraft is provided with narrow delta, compound delta or ogee wings at least the inboard portions of which are of such construction that they do not rely on upper and lower surface skins for their strength, and these inboard portions have mounted therein multiple fans each with a clear path for air flow substantially vertically through the wings.

The provision of multiple fans enables the jet velocity of each individual fan efflux to be maintained low enough to keep the noise from the jets at a tolerable level. The employment of multiple fans has previously been proposed but hitherto no solution has been offered to the difficulty this presents in wing construction. By employing a wing as defined, and preferably one of egg-box type construction with a large number of intersecting spars and ribs, the difficulty is overcome. Also the normal center of lift, and the center of the lift fan thrust, can both be well sited.

However, keeping the jet velocity low does not entirely meet the noise problem because of the high level of sound emitted by the fans themselves. In the preferred arrangement, the air entry and efflux exit of each fan, in the upper and lower wing surfaces respectively, are both provided with closely-spaced vanes or splitters for noise attenuation. These vanes may advantageously be in the form of swivelling louvers so that they can be closed to provide a continuous wing surface across the fan entry and exit during normal forward flight. Moreover, the fan efflux deflection obtainable by adjustment of the exit louvers can be usefully employed in controlling the aircraft in the VTOL and transitional modes of flight.

One aircraft layout in accordance with the invention will now be described by way of example and with reference to the accompanying drawings, in which.

Figure 4:
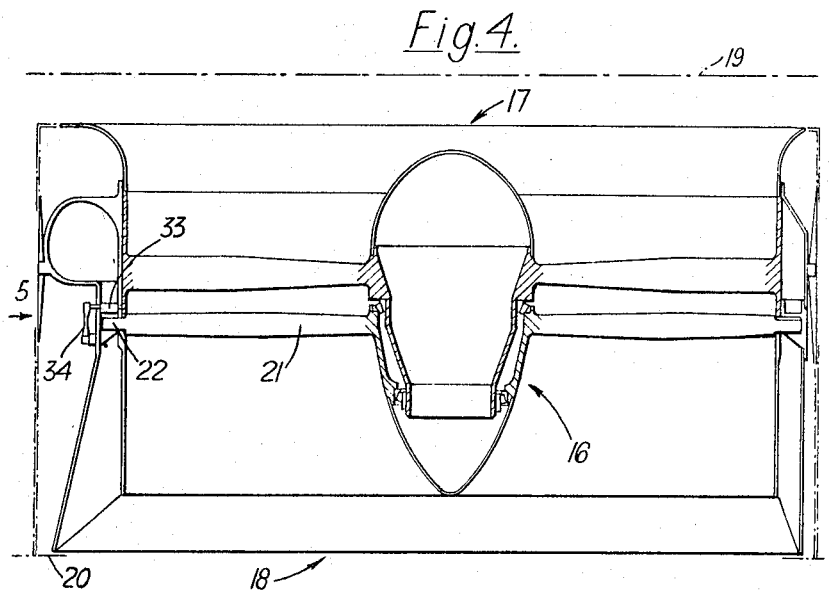
FIGURE 4 is a sectional elevation of a fan unit mounted in the wing.
Figure 5:
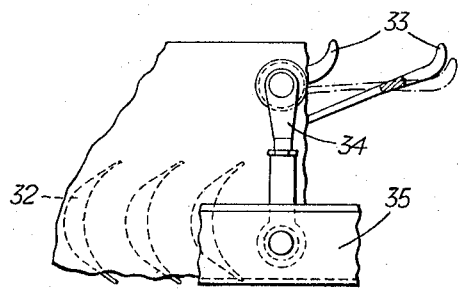

FIGURE 5 is a detail view of the fan installation seen in the direction of the arrow 5 of FIGURE 4, FIGURE 6 is a sectional elevation of adjacent fan bays in the wing showing louvers at the air entries and exits, FIGURE 6 is a sectional elevation of adjacent fan bays in the wing showing louvers at the air entries and exits, FIGURE 7 is a detail elevation showing the fan entry louvers closed, and FIGURE 8 is a view in section on the line 8—8 of FIGURE 7.

The aircraft illustrated in the drawings has comparatively thin ogee wings 11 attached to the fuselage 12 low down just below the internal floor level. These wings are mainly of egg-box type construction, i.e. they comprise a large number of comparatively closely-spaced intersecting spars 13 and ribs 14 which divide the wing area into comparatively small areas 15. As a result of this, continuous upper and lower surface skins over the inboard portions of the wings are not necessary to provide a safe wing structure; therefore fans 16 installed in the wing areas 15, with their axes vertical, may each be given unobstructed air entry and exit openings 17, 18 (FIGURE 4) in the upper and lower wing surfaces 19, 20, respectively.

There are a large number of fans 16, twenty four in each wing, arranged in fore-and-aft rows alongside the fuselage 12 each fan having a single-stage axial-flow rotor 21 giving a low jet velocity of say 400 to 500 ft./sec. Each fan rotor 21 is driven by a tip turbine 22 supplied with air bled from engines for forward propulsion mounted aft on the wings.

Immediately aft of the rearmost fan bays the wing structure embodies a heavy spanwise box-beam spar 23. On this spar are mounted the main undercarriage legs (not shown), attachment ribs for the engines 24, and elevons 25 disposed outboard of the engines. There are four jet-propulsion engines 24 of the variable bypass type arranged in two pairs, one pair on each wing. Each engine has a variable nozzle 26 for the hot jet stream and between each pair of hot jet nozzles 26 there is a third propulsive nozzle 27 receiving cold bypass air taken from both engines of the pair by bleed mufflers 28. These bleed mufflers also feed air, when required, to a system of ducting supplying the tip turbines 22 of the lift fans 16, two-position diverter valves being provided at positions 29 for this purpose. The fan turbine supply ducting system comprises four tapering ducts 30, that is one for each of the four rows of fans, and a transverse interconnecting duct 31, by which it will be seen that all the fan turbines can be supplied in common from either or both pairs of engines.

While conventional stability and control surfaces may be employed in normal forward flight, it is necessary to provide special stability control measures for use at low or zero forward speed when the conventional surfaces are substantially ineffective. Accordingly, a VTOL mode control system is provided based on modulation and deflection of the fan thrusts. Each fan has variable thrust control brought about by the angular adjustment of static nozzle blades at the inlet of the tip turbine 22. FIGURE 5 shows the rotor blades 32 and nozzle blades 33, and indicates how the blades 33 are adjusted by arms 34 which are caused to swing by their pivotal connection to a common adjusting ring 35 that can be turned to a limited extent about the fan axis, and against the action of return springs, by a fan thrust control actuator (not shown). By differential control of the fan thrusts on opposite sides of the aircraft stability in roll is achieved, and likewise differential thrust control of fore-and-aft groups of fans gives stability control in pitch. For deflecting the thrust of each fan to give horizontal acceleration and yaw control, deflector louvers are provided in the fan efflux. These louvers also serve a further purpose as will now be explained.

Figure 1:
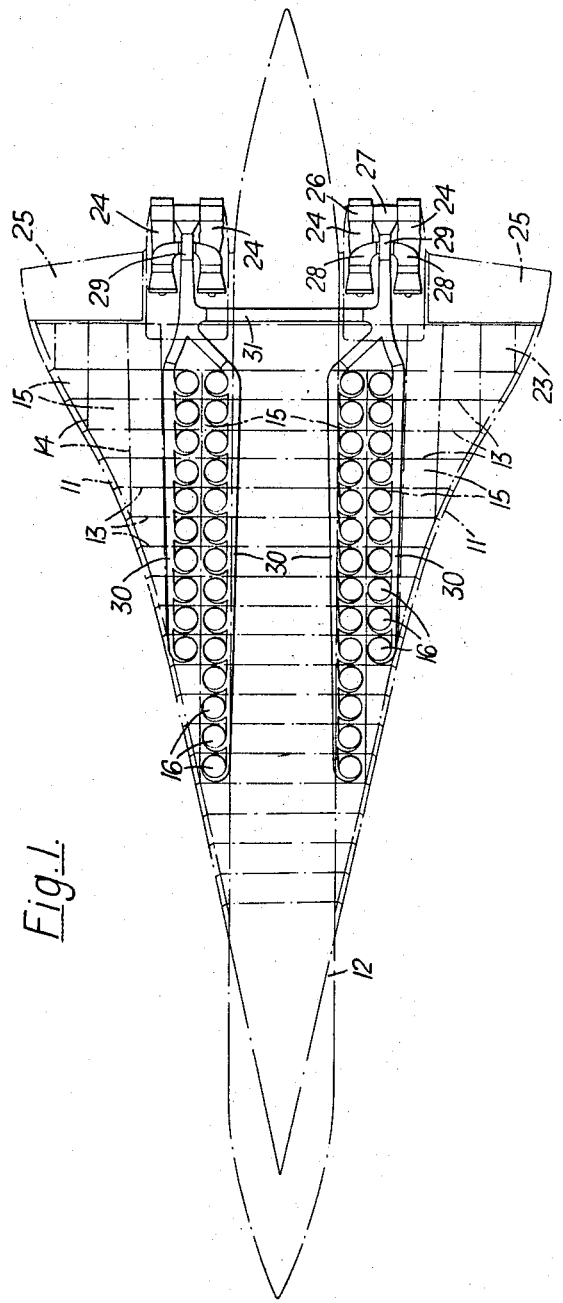
FIGURE 1 is a diagrammatic plan of the aircraft.
Figure 2:
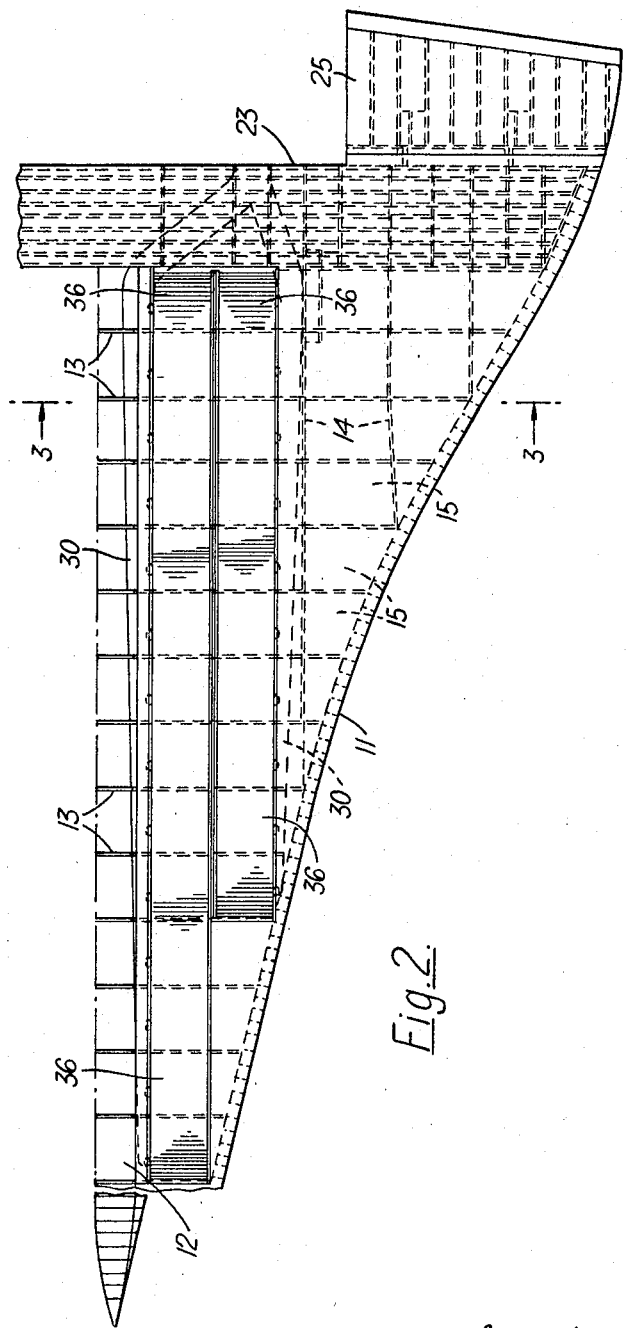
FIGURE 2 is a further plan view showing some details of the wing construction.
Figure 3:
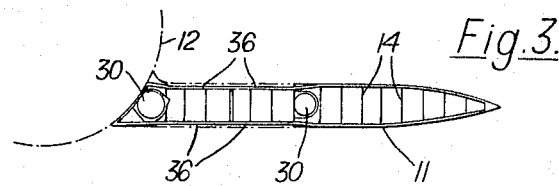
FIGURE 3 is a section on the line 3—3 of FIGURE 2.

By keeping the lifting jet velocity down to 400 to 500 ft./sec., the noise from the actual jets is reduced to an acceptable level. However, the noise of the fans which produce the jets will still be excessive unless special measures are adopted. Even though the wings are quite thin the individual fans housed therein are small and it will be seen in FIGURE 4 that there is room both above and below each fan 16 for attenuating louvers or splitters. FIGURES 2 and 6 show the provision of large numbers of closely-spaced louvers or vanes 36 parallel to one another and at right angles to the fore-and-aft line of the aircraft. These reduce the fan noise, particularly high frequency noise, by absorption as the sound waves emanating in a substantially axial direction from the fan pass through the channels formed between the louvers or vanes. The attenuation obtained is not the same for all frequencies but is a maximum at a certain frequency which is determined by the width of the channels, i.e., by the spacing of the louvers or vanes. The total attenuation achieved at this certain frequency is dependent upon the axial length/width ratio or aspect ratio of the channels.

In the example described maximum attenuation is achieved by the high-frequency band (5000 to 10,000 c.p.s.) by very close spacing of the louvers 36 of the order of one inch. The louvers are constructed to allow satisfactory absorption of energy; they may have skins of perforated, porous or semi-elastic material, with an infilling of low-density absorbent material.

While for the acoustic purpose only fixed vanes are needed, it is nevertheless desirable for other reasons to employ adjustable louvers both above and below each fan. This enables the upper louvers 37 to guide the air flow into the fans and the lower louvers 38 to be employed for efflux deflection. And during normal forward flight the louvers are closed, as illustrated in FIGURE 7, to form smooth wing surfaces above and below the fan bays. To facilitate this the leading edges (when closed) of the upper louvers 37 are drooped as at 39, while the trailing edges of the lower louvers 38 are upswept as at 40. The drag penalty of the louvers, which would be intolerable in normal forward flight if they remained open, is quite modest when they are closed.

The louvers are spring-loaded to close, and they are opened by means of elongated horizontal members 41 (FIGURES 7 and 8) extending in the fore-and-aft direction adjacent the ends of the louvers 36 and which are shiftable vertically by means of inflatable rubber tubes 42. The members 41 have downwardly-extending side flanges with depending lugs 43 that are pivotally-connected to lever plates 44 whereby the louvers 36 are swivelled about their pivots 45. The members 41 and inflatable tubes 42 may be in discrete lengths to enable groups of louvers to be operated selectively.

Apart from the reduction in noise level, the aircraft layout described has numerous other advantages. By reason of its configuration the aircraft can be designed for high block speed leading to low operating cost, while at the same time the narrow wing span will produce low gust-sensitivity. The multiple fans and multiple wing spars make the aircraft particularly safe both in regard to the VTOL system and the wing structure, since the importance of a failure in any one component is greatly lessened. Moreover, air can be supplied to all the lift fans even in the event of failure of a propulsion engine; the failed engine can be isolated from the supply ducting to the fan turbines.

The positioning of the propulsion engines enables air intakes therefore, and boundary diverters, to be situated above the wing trailing edge. Ingestion of debris and compressor noise at ground level are thus minimized.

Although the arrangement illustrated has an ogee wing, it will be understood that similar techniques are applicable in the case of delta or compound delta wings.

I claim:

1. A VSTOL aircraft provided with wings having a plan-form selected from the group comprising narrow delta, compound delta and ogee, at least the inboard portions of said wings being of egg box type construction having a plurality of spaced spars intersecting a plurality of spaced ribs to form a multiplicity of substantially rectangular cell spaces amongst said ribs and spars, said egg box type construction giving the wings their strength without reliance upon upper and lower covering wing skins, and wherein multiple lift fans are mounted each in a respective individual cell space of said inboard wing portions, each said fan thereby having its own clear path for air flow substantially vertically through the wings.

2. An aircraft according to claim 1, wherein the fans are arranged in rows generally parallel to the fore-and-aft line of the aircraft.

3. An aircraft according to claim 1, wherein the air entry and efflux exit of each fan is provided with closely-spaced parallel vanes or splitters for noise attenuation.

4. An aircraft according to claim 3, wherein the vanes are made of sound-absorbing material.

5. An aircraft according to claim 3, wherein the vanes are in the form of hinged louver plates that are closable to provide a continuous wing surface during normal forward flight.

6. An aircraft according to claim 5, and including louver plate closing means actuated by the inflation of inflatable tubes.

7. An aircraft according to claim 1, wherein the fans are driven by tip turbines that are supplied with compressed gas bled from jet propulsion engines constituting the main forward propulsion plant.

8. An aircraft according to claim 7, wherein the propulsion engines are of the variable bypass type, the gas supplied to the fan turbines being cold bypass air.

9. An aircraft according to claim 7, wherein the fan turbines are supplied through a common system of ducting whereby the supply to all can be maintained in the event of failure of a propulsion engine, valves being provided for isolating a failed engine from said ducting system.

10. An aircraft according to claim 1, wherein the wing structure includes a robust box-beam spar aft of the fans, which spar provides a mounting for main undercarriage legs, propulsion engines and elevons.

11. An aircraft according to claim 10, wherein the propulsion engines are arranged in pairs largely or wholly aft of the box spar.

12. A slender wing aircraft according to claim 1, wherein the main propulsion engines are arranged with their intakes above the wing trailing edges.

13. An aircraft according to claim 7, wherein means are provided for modulating and deflecting the fan thrusts for stability and control purposes.

14. An aircraft according to claim 13, wherein the means for modulating the fan thrusts comprise means for mechanically adjusting the non-rotating turbine inlet blading.

References Cited by the Examiner

UNITED STATES PATENTS

| | | | |
|---|---|---|---|
| 3,030,051 | 4/1962 | Kerry et al. | 244—23 |
| 3,056,565 | 10/1962 | Griffith | 244—12 |
| 3,056,566 | 10/1962 | Davidson | 244—15 |
| 3,067,968 | 12/1962 | Heppenstall | 244—74 |
| 3,224,712 | 12/1965 | Taylor et al. | 244—53 |
| 3,227,598 | 1/1966 | Robb | 244—123 X |

FOREIGN PATENTS 235,360    9/1961    Australia.

MILTON BUCHLER, *Primary Examiner.*

L. C. HALL, A. E. CORRIGAN, *Assistant Examiners.*